Patented June 30, 1936

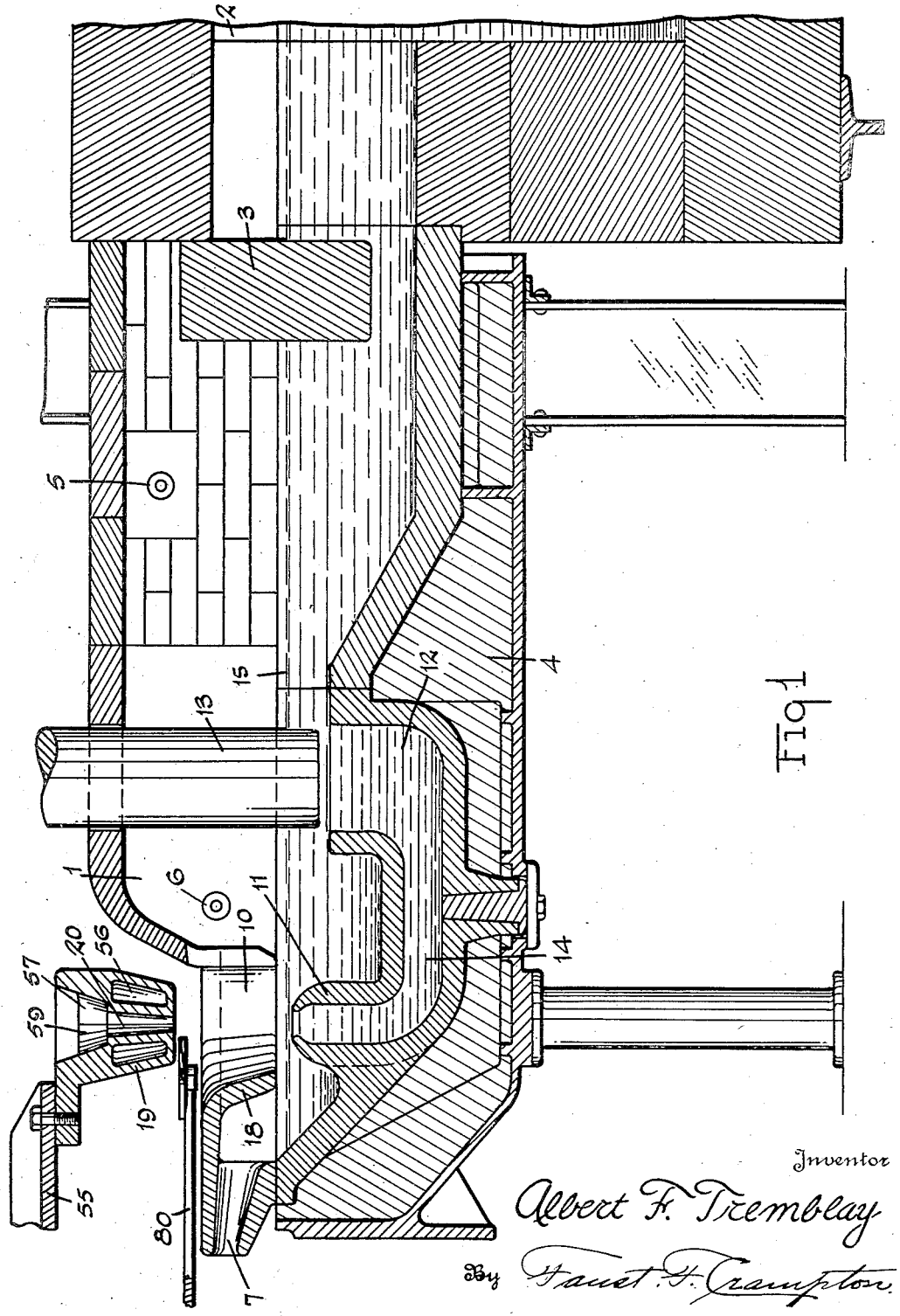

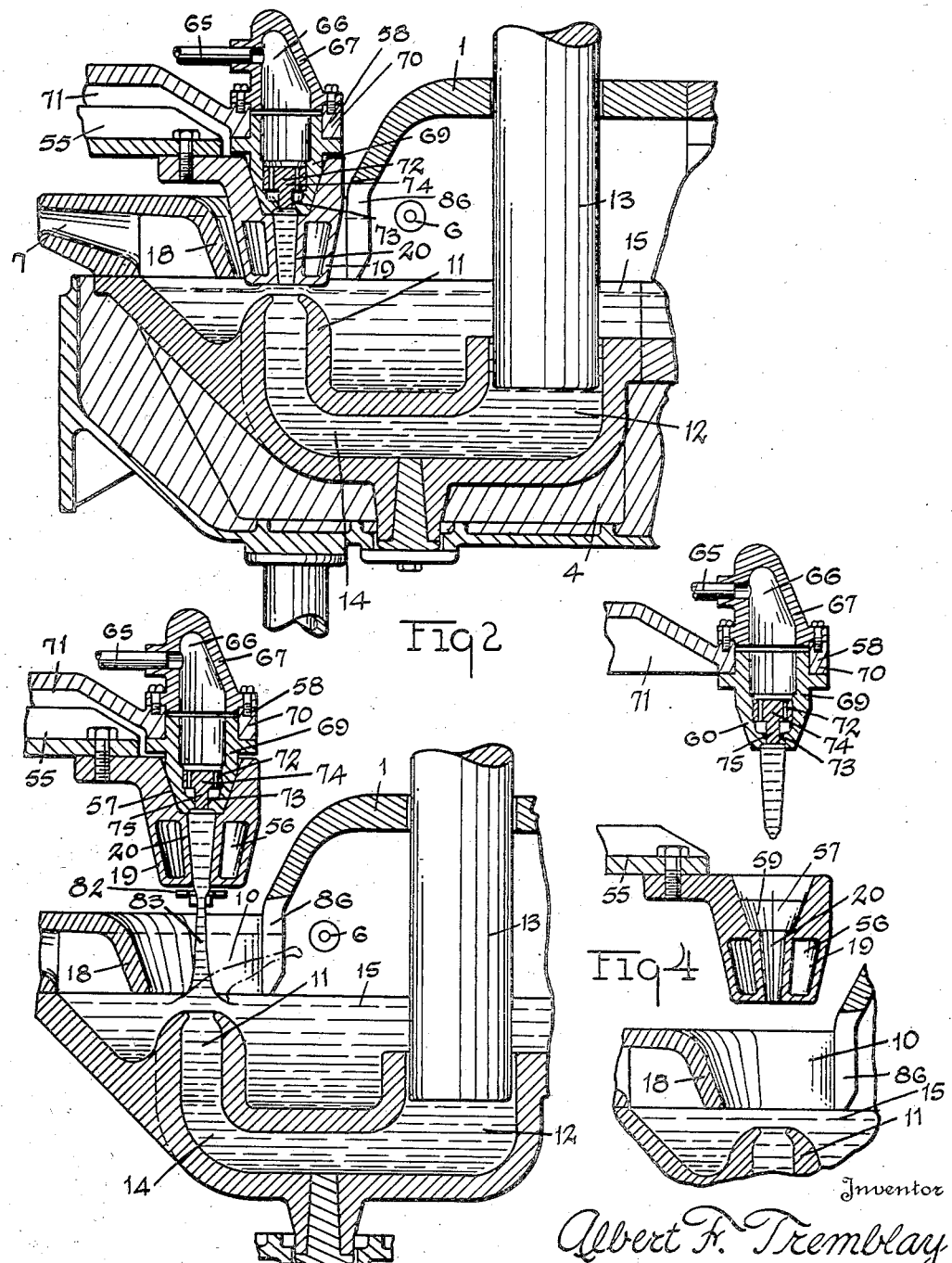

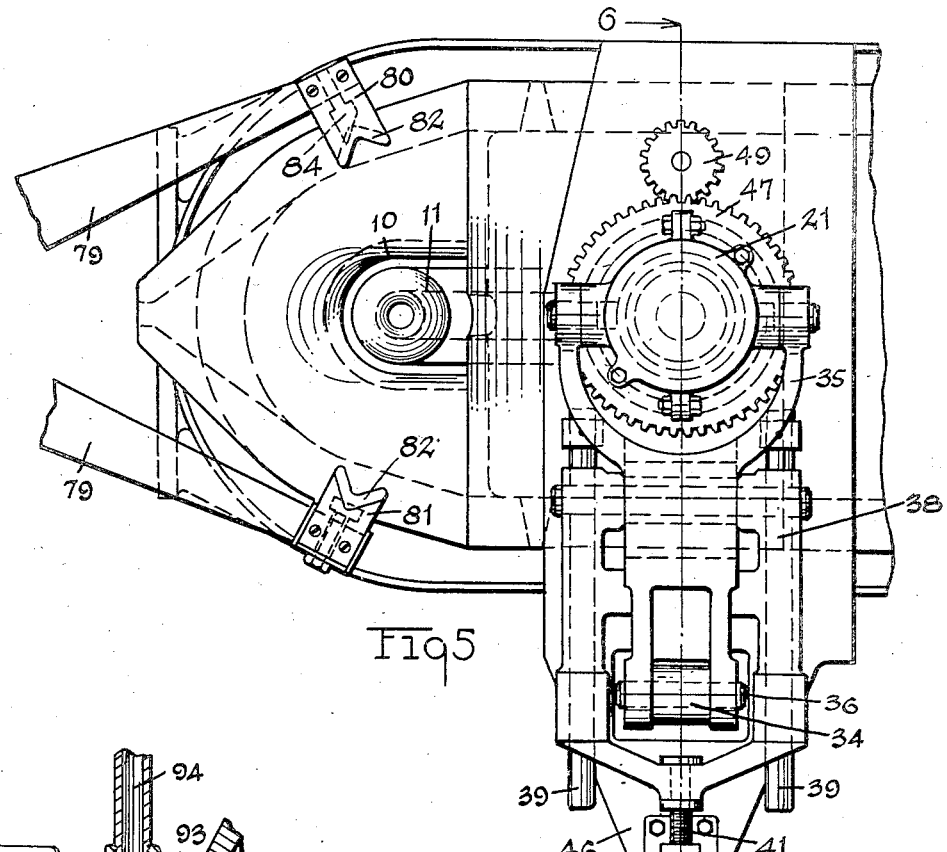
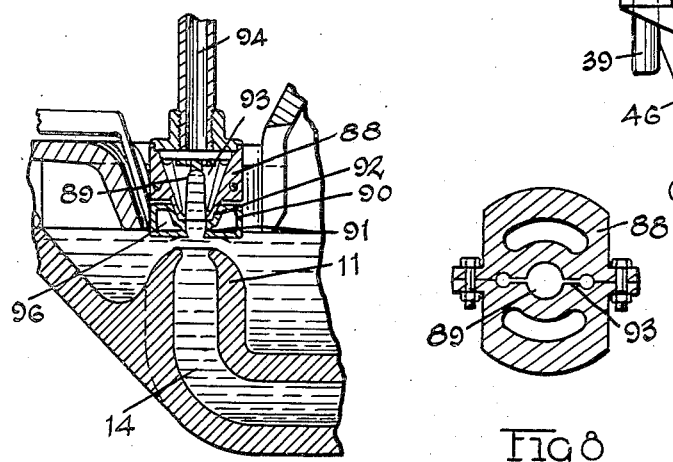

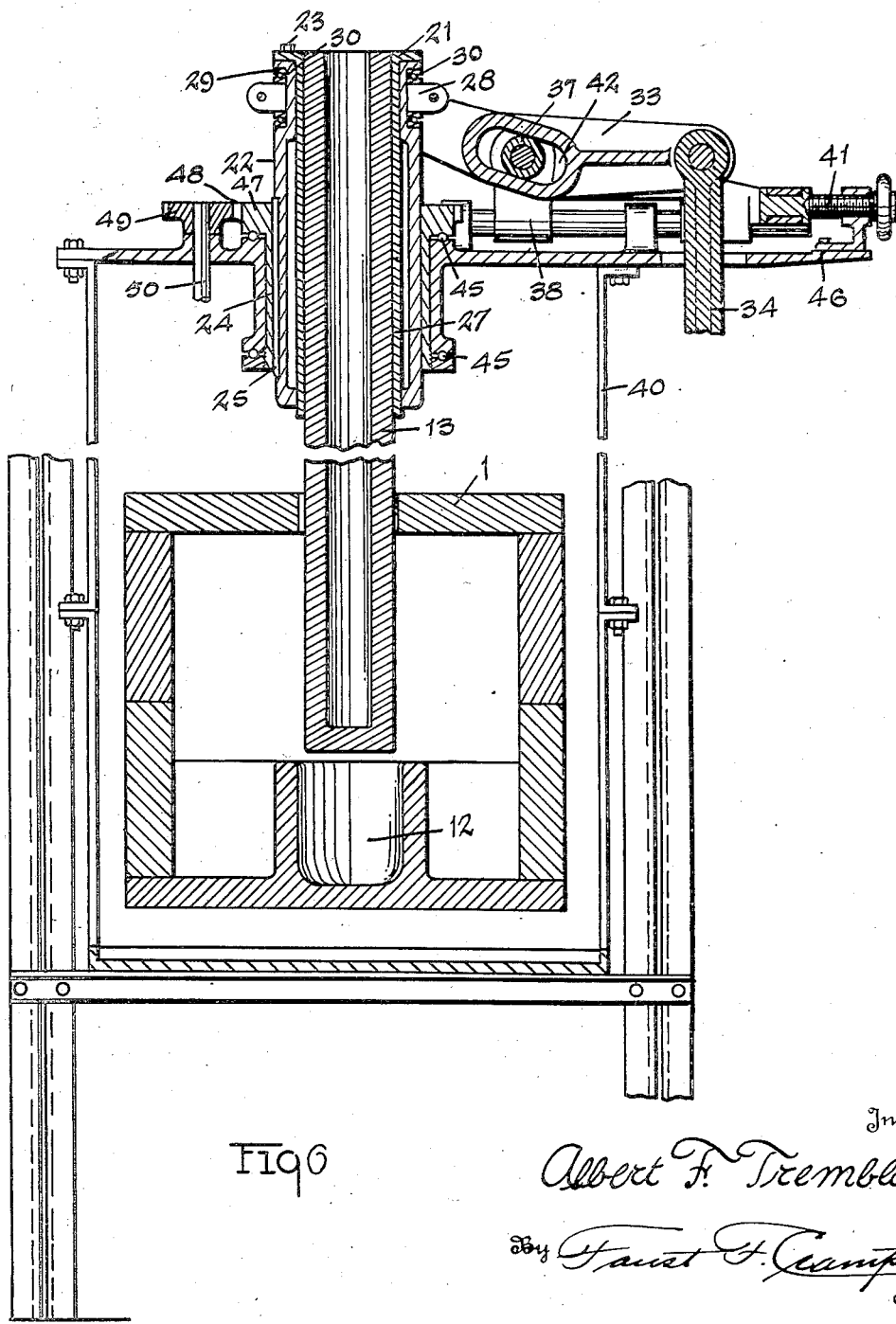

2,046,195

UNITED STATES PATENT OFFICE 2,046,195

GLASS FEEDING APPARATUS

Albert F. Tremblay, Winchester, Ind.

Application April 6, 1932, Serial No. 603,475

6 Claims. (Cl. 49—55)

My invention has for its object to provide an efficient apparatus for feeding glass to shaping molds. In the conduct of the apparatus referred to, the molten glass is locally raised as by ejectment from a nozzle to enable vacuous gathering without more than corner submersion of the gathering receptacle. The invention thus provides a means for gathering glass by suction without undue heating of the gathering receptacle. It enables prompt surface chilling of the charge and consequently enables rapid manipulation of glass charges in producing glass articles.

In the performance of the apparatus there is also produced a circuitous movement of the hot glass from the hotter zones to the dispensing point of the glass and of the cooler glass chilled by exposure and metal contact, to the hotter zones.

The invention also provides for directing the excess clipped glass towards the hotter zones of the glass furnace and in the direction of the moving glass in its circulatory path induced by the apparatus. It also consists in providing a glass charging mold having a relatively small glass contact area to reduce heating of the mold and to enable rapid surface chilling of the glass charge in the mold which enables rapid manipulation of the glass.

The invention consists in other features which will appear from the following description and upon examination of the drawings. Structures containing the invention may partake of different forms and may be varied in their details and still embody the invention. To illustrate a practical application of the invention, I have selected a glass dispensing mechanism that embodies and uses the invention as examples of the various structures and the details of the structures that contain and utilize the invention, and shall describe the selected structure and its method of operation hereinafter, it being understood that variations may be made and that certain features of my invention may be used to advantage without a corresponding use of other features and without departing from the spirit of the invention. The particular structure selected is shown in the accompanying drawings.

Fig. 1 illustrates a view of a vertical section of the forehearth or operating chamber and also illustrates a part of the glass heating tank. Fig. 2 illustrates the glass charged mold in position when gathering glass from the operating chamber. Fig. 3 illustrates the glass charging mold when located in the position different from that shown in Fig. 3. Fig. 4 is a composite view showing the positions of the glass charging mold and transfer head when withdrawn from the operating chamber. Fig. 5 illustrates a top view of the forehearth of the glass tank, and the mechanism for manipulating the glass. Fig. 6 is a view of a section taken on the plane of the line 6—6 indicated in Fig. 5. Fig. 7 illustrates a modified form of the charging mold and transfer head in position in the operating chamber. Fig. 8 illustrates a view of a transverse section of the transfer head shown in Fig. 6.

The glass tank illustrated in the drawings has an operating chamber 1 that is connected to the main chamber 2 of the glass furnace or tank. Preferably, a bridge or skimming wall 3 separates the operating chamber from the glass tank to retain in the glass tank the surface material that floats from the batch melted in the glass tank and to deliver to the operating chamber 1, glass of uniform consistency and viscosity and, at the same time, enable the maintainance of uniform temperature in the operating chamber.

The glass tank is formed of refractory clay blocks, in the manner well known in the art, and is supported by suitable metal structures, such as plates, jack stays and supporting columns, and the like. The operating chamber may be heat insulated and may be heated by suitable burners of the type well known in the art that may be located at advantageous points within the wall of the operating chamber, such as the burners 5 and 6 that may be located in the side walls and, if desired, a burner may be located in the opening 7 formed near the delivery point of the glass to direct a flame in the region of exposure of the glass to atmospheric temperature and the lower temperature of the contacting metal molds by which the glass is withdrawn from the operating chamber.

My invention relates, particularly, to the means utilized in dispensing glass to glass forming machines so as to insure gathering of hot glass, and also to insure complete filling of the charge molds, produce delivery of uniform amounts of glass to the shaping molds, and the production of ware of uniform character and thickness, to insure uniform contours of the charges to enable accurate and uniform operation in final shaping the ware.

In machines for forming glass articles, charges or gobs of glass are often introduced into the shaping molds by means of gravity. In such cases the discharging chamber is provided with a discharge outlet in its bottom and a vertical reciprocable controlling device operates above the said outlet for controlling the quantity of the charges that are allowed to pass through the opening. A mechanically operated shear, located below the outlet, operates to sever the suspended or stringed or excess portion of the discharge which flows by gravity into the shaping mold. This method, well known in the art, produces variations in quantity and causes changes in shape of the gob by reason of changes in temperature and by reason of the ariation in the resultant viscosity renders the manipulation difficult and uncertain. The control of the flow of the glass is also difficult and results in a costly waste of glass. These objectionable features in operation results in the production of articles of wavy appearance and irregular distribution of the glass in the ware that does not exist in methods wherein my invention is utilized, since the charge is uniform in shape and weight and temperature.

It is also customary in the art to sweep over a delivery shelf and gather the glass as the mold is moved circularly and dipped into the glass, the mold being filled by creating a vacuous condition in the upper end of the mold. The mold in such cases becomes over heated and it requires running the machine very slowly and, furthermore, it exposes a large area of the glass to atmospheric temperatures, as well as to the mold, that cools the glass and produces irregularity in the consistency of the glass that is thus gathered.

By the use of the method of my invention, the apparatus, illustrated in the drawings, compact charges of glass of uniform weight and shape and at desired temperatures to suit the particular ware manufactured, is delivered to the shaping molds. Also, by my invention, the glass is raised at the filling point and thereby eliminates dipping of the mold in the glass surface whereby the glass may be drawn into the charging mold by merely contacting the lip of the mold with the surface of the glass. This reduces the heating of the charging mold and the cooling of the glass in the shelf or operating chamber. Furthermore, it enables surface chilling of the charge in the charge mold which also enables ready discharge of the glass into the shaping mold. The means for locally raising or bulging the glass also affords means for producing circulation of the glass from the hotter zone of the operating chamber to the point of delivery of the glass and the return of the cooler glass to the hotter zones.

In the form of construction shown in the drawings, the glass is locally raised beneath a dispensing pocket 10, by means of a submerged nozzle 11, that communicates with a chamber 12 in which a plunger 13 operates to cause movement of the hot glass outward through the nozzle. The chamber 12 and the passageway 14, leading to the nozzle 11, is located below the surface of the glass, which is indicated at 15. The passageway 14 and the chamber 12 are located in the bottom of the operating chamber 1, the glass flows beneath the bridge wall 3 and rises to a level of the glass in the tank. Consequently, the chamber 12 and the passageway 14, as well as the nozzle 11, are filled with the hotter glass. The glass is thereby delivered to a point beneath the dispensing pocket 10.

The pocket 10 is formed by an inwardly turned flange part 18 that extends downwardly from the top of the operating chamber to near the surface 15 of the glass. It is located above the nozzle 11 and substantially in coaxial relationship thereto and so that when the charging molds, such as the mold 19 is inserted in the pocket, it will substantially register with the end of the nozzle 11. The charging mold 19 is provided with a chamber 20 and the charging mold is adapted to make contact with the surface of the glass and at such a point as to locate the chamber 20 in coaxial alignment with the nozzle 11, consequently, when the plunger 13 descends in the chamber 12, the glass is caused to flow through the passageway 14 and outwardly through the nozzle 11, raising the surface of the glass above the nozzle to form a bulging caused by the movement of the glass outward from beneath the surface and enabling contacting of the charging mold 19 along the edge of the chamber 20 and preventing contact with the body of the charging mold except along the lip or edge of the chamber 20. A suitable suction device communicates with the chamber 20 to draw the glass from the stream that thus causes the bulging formation in the surface of the glass into the chamber 20. The chamber 20 may thus be filled by the difference of pressure between the atmosphere and the vacuous condition that is produced at the upper end of the chamber 20 when the plunger 13 descends in the chamber 12.

The plunger 13 may be reciprocated by any suitable device and may have reciprocatory movements of any desired length. If desired, the lower end of the plunger may be located above the edge of the chamber 12 in order to allow a free flow of glass into the chamber 12 when the plunger 13 is withdrawn. Also, the plunger 13 may have a cross sectional area but slightly less than the cross sectional area of the interior dimensions of the chamber 12 to allow the entrance of the glass into the chamber 12, even though the plunger 13 is not entirely withdrawn from the chamber 12. The relative cross dimensions of the plunger 13 and the chamber 12 is such as to produce the movement of the glass through the passageway 14 to the nozzle 11 and prevent a material amount of back flow when the plunger 13 is withdrawn. Each time the plunger 13 ceases in its downward movement, and particularly when it is moved outward from the chamber 12, or if in its extreme position, it is located outside of the chamber 12, the hotter glass readily flows through the large area intermediate the plunger 13 and the open end of the chamber 12, much more readily than the glass will flow over the edge of the nozzle because of the shallow depth at which the nozzle is located. If the nozzle projects to the surface, or above the surface of the glass, the chamber and passageway and nozzle are filled by glass that passes only through the open end of the chamber. In the form shown, the exceedingly small vertical cross section of the glass above the nozzle prevents any return movement of the glass, which, when hottest, has considerable viscosity, from the operating chamber through the nozzle and into the passageway communicating therewith.

The plunger 13 may be operated by any suitable mechanism to regulate the stroke of the plunger as to length or speed of stroke to produce the desired period of flow of the glass from the nozzle 11, and also to produce the desired projection of the glass above the surface of the body of the glass. In the form of construction shown, I have illustrated parts for operating the plunger, it being understood, however, that the construction illustrated may be modified to produce the desired reciprocatory movements. Preferably, also the plunger 13 is rotated. The rotative movements will then coact with the reciprocatory movements to produce circulation and movement of the glass in the operating chamber to maintain substantially uniform temperature throughout the body of the glass located in the operating chamber. The plunger extends through the top of the operating chamber and is connected with a suitable reciprocatory and rotative mechanism that may be actuated by any suitable means.

In the form of construction shown, the plunger 13 is preferably formed of a hollow refractory clay body, preferably tubular in form, and the chamber 12 is preferably substantially cylindrical in form, it being understood, however, that the plunger 13 may be varied in its cross sectional shape. Also the chamber 12 may be varied in shape and different from the plunger. The chamber 12 is preferably formed to have a cross sectional area slightly larger than that of the plunger.

The upper end of the plunger is provided with a sleeve 27 that is connected to the plunger 13 and forms a protective shield whereby the upper end of the plunger may be connected to the actuating mechanism. The sleeve 27 has a flange 21 and a second sleeve 22 is located so as to surround the sleeve 27. The sleeve 22 is formed of two parts and is located beneath the flange 21 and may be connected to the sleeve 27 by means of suitable bolts 23. The part 22 is keyed to the bushing 24 as by the key 25. The sleeve 22 may be shifted longitudinally relative to the bushing 24, the longitudinal movements being guided by the key 25. If desired, a plurality of keys 25 may be disposed intermediate the cylindrical surface of the sleeve 22 and the bushing 24, or these may be splined and thus slidably mounted relative to each other, but rotatively connected. A suitable slip ring 28 is connected to the sleeve 22. Preferably, the upper end of the sleeve 22 is channeled, as at 29, and the slip ring 28 is located in the channeled part 29. Also, suitable roller bearings 30 are located intermediate the edges of the slip ring 28 and the lateral surfaces of the channeled part 29 of the sleeve 22. In order to locate the bearings in the channel part, the sleeve 22 may be provided with a removable end part 30 that may be connected to the body of the sleeve 22 by any suitable means, such as by forming male and female threads on the ends of the body of the sleeve 22 and on the inner end of the part 30. Thus the part 30 may be screwed into the part 22 to establish the interconnection of the slip ring 28 and enable location of the bearings 30 in position. Any other suitable means may be provided for interconnecting these parts, the above being merely illustrative and forms no part of the invention.

The plunger 13 is reciprocated by means of the lever 33 and a link 34. The link 34 may be connected to any suitable driving mechanism adapted to produce reciprocatory movements in the link 34. One end of the lever 33 is connected to the slip ring 28 by means of a yoke 35 and the other end of the lever 33 is connected to the link 34 by means of the pin 36. The lever 33 may be suitably fulcrumed to produce the desired reciprocatory movements in the plunger 13 upon corresponding movements of the link 34.

In the form of construction shown, the lever 33 is fulcrumed on the roller 37 that is supported on an adjustable frame 38. The frame 38 is slidably supported on guides 39 mounted on a supporting frame 40. The frame 38 is adjustably located with reference to the guides 39 by means of a screw 41. The roller 37 is located in the slot 42 formed in the lever. By shifting the frame 38, the roller 37 is shifted in the slot 42 which varies the ratio of the lengths of the arms of the lever 33 and consequently varies the stroke of the plunger 13 by a fixed length of stroke in the link 34.

The plunger 13 is rotated by rotation of the bushing 24. The bushing 24 is provided with suitable bearings 45 located at the ends of suitable bosses that project from the supporting plate 46 that forms a part of the supporting frame 40. The upper end of the bushing 24 is flanged, as at 47, and is provided with an annular gear 48. A suitable pinion 49 meshes with the annular gear. The pinion 49 is driven by a shaft 50 that may be connected to a suitable source of power that produces rotative movements in the shaft 50. Thus, while the plunger 13 may be raised and lowered by the operation of the lever 33, it may also be rotated by means of the pinion 49 that rotates the bushing 24 which is slip keyed to the sleeve 22 that is in turn connected to the sleeve 20 and to the plunger 13.

The movements of the plunger 13 are timed with respect to the movements of the charging mold 19 to produce the ejectment of the glass from the chamber 12 when the charging mold and the suction appparatus is in position to produce a vacuous condition in the upper end of the chamber 20 of the charging mold and thereby fill the chamber 20 upon a mere edge contact of the charging mold with the protruding portion of the glass produced by the inward movement of the plunger 13.

The charging mold 19 is suppported by a suitable arm 55 that may be connected to a suitable mechanism that is adapted to swing the charging mold 19 to a point above the pocket 10 and then cause the charging mold 19 to descend into the pocket. The charging mold 19 may be provided with a suitable jacket 56 through which air or oil or other cooling medium may be circulated in order to keep the charging mold 19 sufficiently cool to produce a slight chilling of the surface of the glass that is drawn into the chamber 20. This enables an early discharge of the charge of glass from the mold into the shaping mold. The cooling medium may be directed to the chambers of the jacket 56 by any suitable pipes that may be carried by the arm 55, in the manner well known in the art.

The upper end of the charging mold 19 is provided with a socket 57 for receiving the transfer head 58. The socket 57 has a portion 59 which quite accurately fits the conical portion 60 formed on the transfer head 58 and when the head 58 is socketed in the charging mold, the interfitting portions 59 and 60 prevent leakage of air into the chamber 20 upon exhaustion of the air from the chamber 20.

The vacuous condition in the upper end of the chamber 20 is produced by the suction pipe 65 that is connected to the chamber 66 formed in the transfer head 58. The transfer head may be formed of two parts 67 and 68 that are connected to the opposite sides of the ring 70 formed on the end of a suitable arm 71. The parts 67 and 68 may be bolted to the ring 70 or may be otherwise secured in registering relationship and form the chamber 66, that communicates with the chamber 20 when the transfer head 58 is socketed in the charging mold 19. Preferably, the chamber 66 communicates through openings 72 of small bore and a narrow annular opening 73. The openings 72 are formed in the block 74 located in the lower end of the transfer head 58 and the narrow annular slot 73 is located intermediate a stem 75 having a diameter slightly smaller than the opening in the lower end of the transfer head. It forms a narrow annular slit that will permit the withdrawal of the air from the chamber 20 and yet prevent the flow of glass into the transfer head. It will create a vacuous condition at the upper end of the glass charge that is drawn into the chamber 20 sufficiently to enable the retention of the glass charge by atmospheric pressure against the lower end of the transfer head 58 when the transfer head is lifted from the charge mold. When the surface of the glass charge is slightly chilled, the charge, which corresponds in shape to the chamber 20, may be withdrawn from the charge mold by the transfer head, the transfer head being lifted by the arm 71. The hot charge of glass may then be moved to a forming mold by the arm 71.

The arm 71 may also be connected to mechanism that operates to swing the transfer head 58 so as to register the transfer head with the charge mold and to lower the transfer head into the socket of the charge mold, and the arm 55, that supports the charge mold, may coact with the arm 71 that supports the transfer head, to lower the transfer head and the charge mold into the pocket 10 slightly in advance of the descent of the plunger 13 which raises locally the level of the glass so as to make contact with the lip of the chamber 20. When the contact is made a suitable means may be provided for establishing connection with the chamber 66 of the transfer head 58, as by a valve located in the pipe connecting with the pipe 65, which draws the glass into the chamber 20. This produces in each operation the same compact charge of glass that is transferred to the shaping mold.

When the charge mold 19 and the transfer head 58 are lifted, there is produced the usual string or draw of the surplus glass, as illustrated in Fig. 3. The surplus glass is sheared in close proximity to the lower end of the charge mold. The chamber 20 of the charge mold is tapered to enable withdrawal of the charge by the transfer head and also provides a small opening at the lower end of the chamber 20 which operates to confine the glass and prevent withdrawal of the glass by reason of its tenacity to the string. The chilling of the surface of the charge operates to retain the charge within the charge mold. The excess glass is severed at the top of the pocket 10 and preferably the string is tipped inwardly with respect to the operating chamber 1 as it is sheared.

The shears are located on a pair of swinging arms 79. The shears 80 and 81 are provided with V-shaped edges 82 and are so mounted with respect to the centers of oscillatory movements of the arms 79 as to cause registration of the corners of the edges 82 with the center of the lower opening of the tapered chamber 20 and at a point in close proximity to the lower end of the charge mold when located in substantial axial alignment with the nozzle 11. Preferably, the shear 81 is mounted by any suitable means to provide a slight floatable relation to the other of the shears to insure sliding movement of one shear on the surface of the other, notwithstanding any inaccuracy of the support or slight misalignment. The mechanism that operates the shears 80, 81 is also timed with reference to the withdrawal of the transfer head and the charge mold from the pocket 10 to cut the surplus glass upon the completion of the withdrawal of the charge mold from the pocket 10.

The surplus glass 83 is dipped inwardly with respect to the operating chamber by means of a cam block 84. The cam block 84 has an end edge located in proximity to the shearing edge 82 of one of the shears 80. The floating shear 81 preferably passes above the shear 80 which has associated therewith the cam block 84. This locates the cam block in position to engage the upper end of the excess glass 83 and upon continued movement of the shear 80, and the cam block 84 transverse to the glass string, the cam block operates to tip the excess glass 83 inwardly towards the central part of the operating chamber. Preferably, the side wall of the pocket 10 is provided with a slot 86 through which the upper end of the excess glass 83 passes as it tilts inwardly in the operating chamber. The circuitous movement of the glass constantly induced by the rotation of the plunger 13 and the sequential inward movements of the plunger into the chamber, carries the sheared glass into the body of the chamber where it is heated by the flame from the burners which direct fuel gas into the operating chamber and maintain the glass in the chamber at the desired temperature.

If desired, the transfer head may be provided with a chamber that may be used as part of the gob shaping chamber to provide an extended suction area of the glass to increase the effective difference in pressure produced by the vacuous condition created in the transfer head. In the form of construction shown in the Figs. 7 and 8, the transfer head 88 is provided with a tapered chamber 89. The smaller end of the chamber 89 is at the upper end of the chamber. The charge mold 90 is provided with a chamber 91 that registers with the chamber 89 and forms an extension of the chamber 89. The chamber 91 is also tapered, the smaller end of the chamber being located at the lower end of the charge mold, while the upper end of the chamber 91 has a diameter substantially the same as the diameter of the lower end of the chamber 89. The transfer head and the charge mold are provided, one with the protuberance and the other with a socket that form sealing conical surfaces 92 that contact when the transfer head 88 is placed in the charge mold. The transfer head is provided with slots 93 that communicate with the pipe 94 and form thereby passageways that extend to the lower end of the chamber 89 and thereby increase the suction area.

The glass is projected through the nozzle 11 by the operation of the plunger 13 to raise the surface of the glass locally, the charge mold and the transfer head having been placed in registration with each other and in axial alignment with the nozzle, the vacuous condition produced in the chambers 89 and 91 operates to draw the glass into the chambers. The transfer head and the charge mold are then raised and separated and the excess glass is sheared beneath the charge mold in the same manner that it is shown in connection with the former construction shown in the other figures and the transfer head is separated from the charge mold and transfers the charge, as in the other form of device.

In the form of construction shown in Figs. 7 and 8, the charge mold is provided with a chamber 96 through which a suitable cooling medium may be directed to maintain the temperature of the charge mold sufficiently cool to enable immediate separation of the glass held in the transfer head from the charge mold, and enable rapid operation of the machine.

The charges of glass may thus be readily transferred to the shaping molds and returned for gathering new charges of glass. The invention thus provides a glass feeding machine that prevents heating of the charge mold and thereby enables rapid filling and withdrawal of the glass from the charge mold. It also provides a means for delivering to the shaping molds, a uniform quantity of compact glass having a uniform high temperature and thereby enabling a uniform operation of the shaping machine. Also, the temperature of the glass in the operating chamber, particularly at the point of deliverance of the glass through the nozzle to the charge mold, is maintained constant by the glass delivery pocket and the burners located in the vicinity of the pocket. The invention reduces to a minimum the exposure to atmospheric temperatures. This reduces heat losses to a minimum. The invention also provides a means whereby charge molds having chambers of desired dimensions and shapes may be used and thereby enables the deliverance of charges of glass of uniform shape and weight, compact in character and without bubbles or flaws. The invention thus provides an exceedingly efficient machine that may be readily operated to produce glass ware or articles of different forms.

I claim:

1. In a glass feeding apparatus, a furnace for heating glass, a glass feeding shelf, the bottom wall of the furnace and the shelf having a passageway extending from within the furnace to within the shelf and having upturned ends, the upturned ends located below the surface of the glass within the furnace, a plunger movable in the end of the passageway located in the furnace, and means for reciprocating the plunger to move glass in the passageway through the passageway into the glass of the shelf and thereby move to the shelf only glass located below the surface of the glass in the furnace and in the shelf.

2. In a glass feeding apparatus, a furnace for heating glass, a glass feeding shelf, the bottom wall of the furnace and the shelf having a passageway extending from within the furnace to within the said shelf and having upturned cylindrical end parts located one within the furnace and the other in the shelf, a cylindrical plunger reciprocable in the upturned end part located in the furnace, the wall of the upturned end part located in the shelf having an inwardly extending relatively thin flange forming a restricted circular outlet at the delivery end of the passageway, means for reciprocating the plunger to move the glass from the furnace into the shelf through the said restricted opening and to produce an upwardly directed unconfined current of greatly increased rate of movement from a point below the surface of the glass by the quick change in diameter of the stream of moving glass at the said outlet to form a marked bulge in the glass above the level of the pool of glass in the shelf, and means for drawing glass from the bulge formed in the pool of glass in the shelf.

3. In a glass feeding apparatus, a furnace for heating glass, a glass feeding shelf, a bottom wall of the furnace and the shelf having a passageway extending from within the furnace to within the shelf and having upturned ends located below the surface of the glass within the furnace, a plunger movable in the end of the passageway located in the furnace, and means for reciprocating the plunger, means for gathering glass from above the upturned end of the passageway in the shelf, a wall depending near the surface of the glass and located intermediate the shelf and the furnace, a heater for heating the glass located intermediate the wall and the plunger, means for rotating the plunger for producing local circulatory movements of the surface of the glass from the shelf to the furnace for raising the temperature of the glass that is cooled when in the shelf.

4. In a glass feeding apparatus for feeding glass to glass forming molds, a furnace for heating glass, a glass feeding shelf, the bottom of the furnace and the shelf having a passageway extending from within the furnace to within the shelf and having upturned ends, the upturned ends located below the surface of the glass within the furnace, means for moving the glass through the passageway to produce an upward current of unconfined glass within the glass of the shelf, the shelf having a top wall substantially covering the glass in the shelf, the top wall having an open end pocket, the pocket located substantially in a line with the upturned end of the passageway in the shelf, a one-piece charging mold insertable into the pocket to receive glass raised from the upturned end part of the passageway in the shelf and having an inverted substantially conical interior continuous glass shaping surface, and means for directing a cooling fluid through the charging mold in heat transferring relation to the glass shaping surface, a transfer head having a part fitting the interior of the charging mold, means for separating the transfer head from the charging mold, a suction means connected to the transfer head for drawing glass from the shelf into the charging mold and for removing the glass from the glass shaping surface when the glass is surface cooled by the cooling fluid when the transfer head and the charging mold is separated.

5. In a glass feeding apparatus, a shelf having a top wall covering the shelf, the top wall having a pocket depending downwardly and open at its lower end, the lower edge of the pocket located near the surface of the glass, a gathering means for drawing glass from the shelf, shearing members for severing gobs from the gathering means, one of the shearing members having a cam member for tilting the gobs to the part of the surface of the glass within the area of the said edge of the pocket, a passageway extending from within the furnace to a point beneath the pocket, a plunger for forcing glass towards the pocket, a heater located in the furnace intermediate the plunger and the pocket, means for rotating the plunger to produce local circulation of the glass to draw the gobs and the surface glass into the furnace.

6. In a glass feeding apparatus, a shelf having a top wall covering the shelf, the top wall having a pocket depending downwardly and open at its lower end, the lower edge of the pocket located near the surface of the glass, the side wall of the pocket contiguous to the furnace having a slot, a gathering means for drawing glass from the shelf and movable to the glass of the shelf within the pocket, shearing members for severing gobs from the gathering means, one of the shearing members having a cam member for tilting the gobs towards the slot, a passageway extending from within the furnace to a point beneath the pocket, a plunger for forcing glass towards the pocket, a heater located in the furnace intermediate the plunger and the pocket, means for rotating the plunger to produce local circulation of the glass to draw the gobs and the surface glass into the region of the heating means.

ALBERT J. TREMBLAY.